United States Patent
Perry et al.

(10) Patent No.: US 11,362,359 B2
(45) Date of Patent: Jun. 14, 2022

(54) REDOX FLOW BATTERY SYSTEM WITH ELECTROCHEMICAL RECOVERY CELL

(71) Applicant: United Technologies Corporation, Farmington, CT (US)

(72) Inventors: Michael L. Perry, Glasonbury, CT (US); Robert Mason Darling, South Windsor, CT (US); James D. Saraidaridis, Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 2 days.

(21) Appl. No.: 16/418,120

(22) Filed: May 21, 2019

(65) Prior Publication Data

US 2020/0373597 A1    Nov. 26, 2020

(51) Int. Cl.
*H01M 8/18* (2006.01)
*H01M 8/0662* (2016.01)

(52) U.S. Cl.
CPC ......... *H01M 8/0662* (2013.01); *H01M 8/188* (2013.01); *Y02E 60/50* (2013.01)

(58) Field of Classification Search
CPC ...... H01M 8/0662; H01M 8/188; Y02E 60/50
See application file for complete search history.

(56) References Cited

U.S. PATENT DOCUMENTS 9,853,310 B2    12/2017    Darling et al.
2008/0292964 A1*  11/2008    Kazacos ............. H01M 8/1088
                                                        429/231.5
2014/0363747 A1    12/2014    Evans et al.
2015/0017556 A1    1/2015    Kim et al.
(Continued)

FOREIGN PATENT DOCUMENTS

WO    2016160028    10/2016
WO    2017062936    4/2017

OTHER PUBLICATIONS

Schweiss, R., Pritzl, A., and Meiser, C. (2016). Parasitic hydrogen evolution at different carbon fiber electrodes in vanadium redox flow batteries. Journal of the Electrochemical Society, 163(9). Jul. 27, 2016. pp. A2089-A2094.

(Continued)

*Primary Examiner* — Milton I Cano
*Assistant Examiner* — Jenna Shulman
(74) *Attorney, Agent, or Firm* — Carlson, Gaskey & Olds, P.C.

(57) ABSTRACT

A redox flow battery system includes a redox flow battery that has a redox flow cell, and a supply/storage system external of the redox flow cell. The supply/storage system includes first and second electrolytes for circulation through the redox flow cell. At least the first electrolyte is an aqueous liquid electrolyte that has electrochemically active species with multiple, reversible oxidation states. There is a gas vent passage connected with the redox flow battery to receive water byproduct that evolves from side reaction of the first electrolyte. A bypass passage is connected with the supply/storage system to receive the aqueous electrolyte. An electrochemical recovery cell includes a first half-cell connected to the gas vent passage to receive as a reactant the water byproduct and a second half-cell connected to the bypass passage to receive as a reactant the first electrolyte.

15 Claims, 3 Drawing Sheets

(56) References Cited

U.S. PATENT DOCUMENTS

2016/0056487 A1    2/2016   Darling et al.
2018/0316032 A1   11/2018   Song et al.
2020/0161687 A1*   5/2020   Han .................. H01M 8/04223

OTHER PUBLICATIONS

Murthy, S.K., Sharma, A.K., Choo, C., and Birgersson, E. (2018). Analysis of concentration overpotential in an all-vanadium redox flow battery. Journal of the Electrochemical Society, 165(9). Jun. 9, 2018. pp. A1746-A1752.

Gahn, R.F., Hagedorn, N.H., and Johnson, J.A. (1985). Cycling performance of th iron-chromium redox energy storage system. NASA-TM-87034. Prepared for Twentieth Intersociety Energy Conversion Engineering Conference cosponsored by the SAE, ANS, ASME, IEEE, AIAA, ACS, and AlchE. Miami Beach, FL. Aug. 18-23, 1985.

European Search Report for European Patent Application No. 20175741.6 completed Oct. 15, 2020.

\* cited by examiner

REDOX FLOW BATTERY SYSTEM WITH ELECTROCHEMICAL RECOVERY CELL

BACKGROUND

Redox flow batteries ("RFBs") are designed to convert electrical energy into chemical energy that can be stored and later released when there is demand. As an example, an RFB may be used with a renewable energy system, such as a wind-powered system, to store energy that exceeds consumer demand at some point in time and later release that energy when there is greater demand.

A typical RFB includes a redox flow cell that has a first or positive electrode and a second or negative electrode separated by an ion-conducting separator, such as an ion-exchange membrane. A first or positive fluid electrolyte (sometimes referred to as the posolyte) is delivered to the positive electrode and a second or negative fluid electrolyte (sometimes referred to as the negolyte) is delivered to the negative electrode to drive reversible redox reactions. Upon charging, the electrical energy supplied causes an electrochemical reduction reaction in one electrolyte and an electrochemical oxidation reaction in the other electrolyte. The separator prevents the electrolytes from freely and rapidly mixing but permits selected ions to pass through to balance the redox reactions. Upon discharge, the chemical energy contained in the liquid electrolytes is released in the reverse reactions and electrical energy can be drawn from the electrodes. RFBs are distinguished from other electrochemical energy storage devices by, inter alia, the use of externally-supplied, fluid electrolyte solutions that include reactants that participate in reversible electrochemical reactions.

SUMMARY

A redox flow battery system according to an example of the present disclosure includes a redox flow battery that has a redox flow cell and a supply/storage system external of the redox flow cell. The supply/storage system has first and second electrolytes for circulation through the redox flow cell. The first and second electrolytes are aqueous liquid electrolytes that have electrochemically active species with multiple, reversible oxidation states, a gas vent passage connected with the redox flow battery to receive water byproduct that evolves from side reaction of the first electrolyte. A bypass passage is connected with the supply/storage system to receive the second electrolyte, and an electrochemical recovery cell that has a first half-cell is connected to the gas vent passage to receive as a reactant the water byproduct and a second half-cell connected to the bypass passage to receive as a reactant the second electrolyte.

In a further embodiment of any of the foregoing embodiments, the gas vent passage has a pressure relief valve downstream of the supply/storage system and the electrochemical recovery cell such that flow of the water byproduct through the electrochemical recovery cell depends on pressure-release of the pressure relief valve.

In a further embodiment of any of the foregoing embodiments, the supply/storage system has at least one storage vessel, and the gas vent passage is connected with a headspace of the storage vessel.

A further embodiment of any of the foregoing embodiments includes an inert gas source connected with the headspace and maintaining a positive pressure in the headspace and gas vent passage.

In a further embodiment of any of the foregoing embodiments, downstream of the electrochemical recovery cell the bypass passage leads into the at least one storage vessel.

In a further embodiment of any of the foregoing embodiments, the first half-cell has a first electrode that has a metal catalyst or a phthalocyanine catalyst and the second half-cell includes a second electrode that excludes any metal catalyst.

In a further embodiment of any of the foregoing embodiments, the first electrode is the metal catalyst and is selected from the group consisting of platinum group metals, nickel, iron, cobalt, and combinations thereof.

In a further embodiment of any of the foregoing embodiments, the first electrode is the metal catalyst and includes rhodium sulfide, $Rh_xS_y$.

In a further embodiment of any of the foregoing embodiments, the first electrode is the phthalocyanine catalyst and is selected from the group consisting of silver phthalocyanine, iron phthalocyanine, and combinations thereof.

In a further embodiment of any of the foregoing embodiments, the second electrode is carbon paper.

In a further embodiment of any of the foregoing embodiments, the electrochemical recovery cell has a separator between the first half-cell and the second half-cell, and the separator is an ion exchange membrane, has a thickness of 50 to 300 micrometers, and has a dimensionless selectivity of at least 1000.

A further embodiment of any of the foregoing embodiments includes an additional electrochemical recovery cell has an additional first half-cell and an additional second half-cell, and an additional gas vent passage is connected with the redox flow battery to receive water byproduct that evolves from side reaction of the second electrolyte. The additional first half-cell connected to the additional gas vent passage to receive as a reactant the water byproduct of the second electrolyte and the additional second half-cell connected to the additional bypass passage to receive as a reactant the first electrolyte.

A further embodiment of any of the foregoing embodiments includes a potentiostat controlling voltage of the electrochemical recovery cell.

A method for recovering water byproducts in a redox flow battery system according to an example of the present disclosure includes operating the redox flow battery and recovering the water byproduct by passing the water byproduct through a first half-cell of an electrochemical recovery cell and passing the aqueous electrolyte from a bypass passage that is connected with the supply/storage system through a second half-cell of the electrochemical recovery cell. The electrochemical recovery cell reacts the water byproduct to produce water that is incorporated in the aqueous electrolyte.

In a further embodiment of any of the foregoing embodiments, the passing the water byproduct through the first half-cell depends on a pressure-release of a pressure relief valve downstream of the electrochemical recovery cell.

In a further embodiment of any of the foregoing embodiments, the supply/storage system has at least one storage vessel containing the first electrolyte, and the water byproduct is captured from a headspace of the storage vessel.

A further embodiment of any of the foregoing embodiments includes maintaining a positive pressure in the headspace and gas vent passage using an inert gas source connected with the headspace.

In a further embodiment of any of the foregoing embodiments, the first half-cell includes a first electrode that has a metal catalyst or a phthalocyanine catalyst and the second half-cell includes a second electrode that excludes any metal catalyst.

In a further embodiment of any of the foregoing embodiments, the first electrode is the metal catalyst and is selected from the group consisting of platinum group metals, nickel, iron, cobalt, and combinations thereof.

In a further embodiment of any of the foregoing embodiments, the first electrode is the phthalocyanine catalyst and is selected from the group consisting of silver phthalocyanine, iron phthalocyanine, and combinations thereof.

In a further embodiment of any of the foregoing embodiments, the second electrode is carbon paper.

In a further embodiment of any of the foregoing embodiments, the electrochemical recovery cell has a separator between the first half-cell and the second half-cell, and the separator is an ion exchange membrane, has a thickness of 50 to 300 micrometers, and has a dimensionless selectivity of at least 1000.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
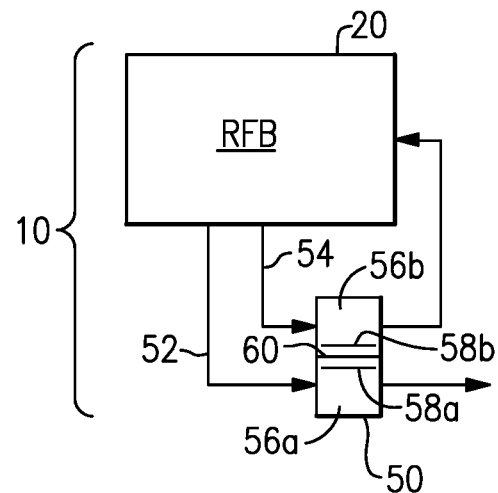
FIG. 1 illustrates an example flow battery system that has an electrochemical recovery cell for recovering evolved hydrogen or oxygen.

FIG. 1 schematically shows portions of an example system 10 that includes a redox flow battery 20 ("RFB 20") for selectively storing and discharging electrical energy. As an example, the RFB 20 can be used to convert electrical energy generated in a renewable energy system to chemical energy that is stored until a later time when there is greater demand, at which time the RFB 20 can be used to convert the chemical energy back into electrical energy. The flow battery 20 can supply the electric energy to an electric grid, for example.

Figure 2:
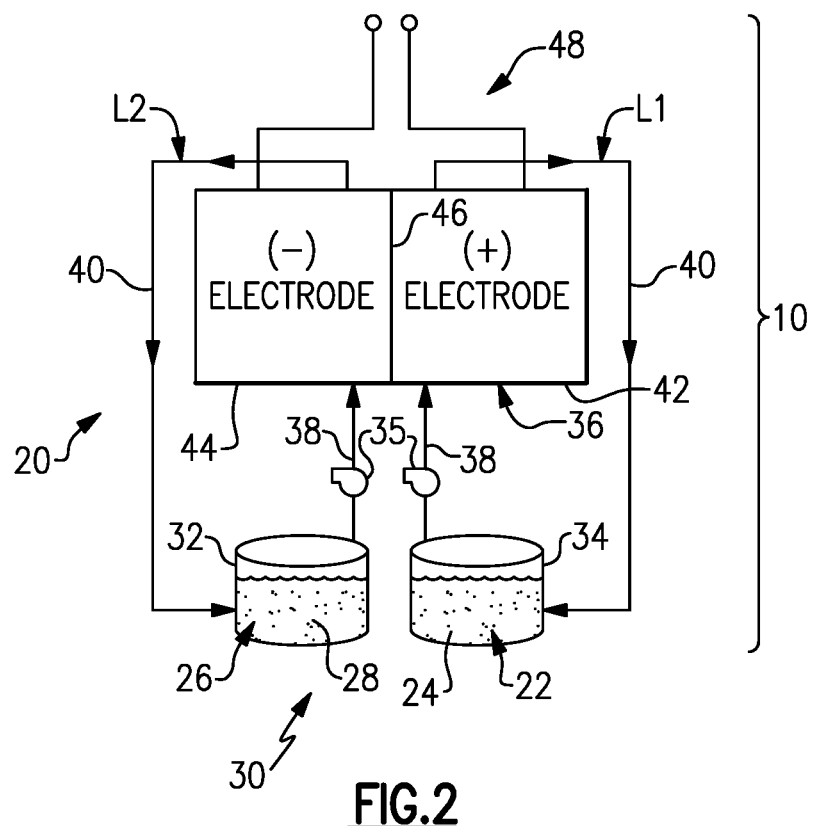
FIG. 2 illustrates an example redox flow battery of the system.

FIG. 2 illustrates a non-limiting example of the RFB 20. The RFB 20 includes a first electrolyte 22 that has at least one electrochemically active species 24 that functions in a redox pair with regard to a second electrolyte 26 that has at least one electrochemically active species 28. As will be appreciated, the terminology "first" and "second" is to differentiate that there are two architecturally distinct electrolytes. It is to be further understood that terms "first" and "second" are interchangeable in the embodiments herein in that the first electrolyte 22 could alternatively be termed as the second electrolyte, and vice versa, or even the same electrolyte, but housed in the opposing tank and reactor volume.

The electrolytes 22, 26 are aqueous liquid solutions. For example, the electrochemically active species 24, 28 can be based on aqueous solutions of vanadium species. The electrochemically active species 24, 28 can include ions of elements that have multiple, reversible oxidation states in a selected liquid solution, such as but not limited to, aqueous solutions or dilute aqueous acids, such as 1-5M sulfuric acid. In some examples, the multiple oxidation states are non-zero oxidation states, such as for transition metals including but not limited to vanadium, iron, manganese, chromium, zinc, molybdenum and combinations thereof, and other elements including but not limited to sulfur, cerium, lead, tin, titanium, germanium and combinations thereof. In some examples, the multiple oxidation states can include the zero oxidation state if the element is readily soluble in the selected liquid solution in the zero oxidation state. Such elements can include the halogens, such as bromine, chlorine, and combinations thereof. The electrochemically active species 24, 28 could also be organic molecules or macromolecules that contain groups that undergo electrochemically reversible reactions, such as quinones or nitrogen-containing organics such as quinoxalines or pyrazines. In embodiments, the electrolytes 22 and 26 are aqueous solutions that include one or more of the electrochemically active species 24, 28. The first electrolyte 22 (e.g., the positive electrolyte) and the second electrolyte 26 (e.g., the negative electrolyte) are contained in a supply/storage system 30 that includes first and second vessels 32, 34.

In one example based on aqueous vanadium electrolyte chemistry with equimolar electrolytes 22, 26, the electrolytes together have an average oxidation state of +3.5 based upon the use of $V^{2+}/V^{3+}$ and $V^{4+}/V^{5+}$ (which can also be denoted as V(ii)/V(iii) and V(iv)/V(v), although the charge of the vanadium species with oxidation states of 4 and 5 are not necessarily +4 and +5) as the electrochemically active species 24, 28. For example, if the electrolyte solution is aqueous sulfuric acid, then the V(iv)/V(v) species of the first electrolyte 22 will be present as $VO^{2+}$ and $VO_2^+$ and the V(ii)/V(iii) species of the second electrolyte will be present as and $V^{2+}$ and $V^{3+}$ ions.

The electrolytes 22, 26 are circulated by pumps 35 to at least one redox flow cell 36 of the flow battery 20 through respective feed lines 38, and are returned from the cell 36 to the vessels 32, 34 via return lines 40. As can be appreciated, additional pumps 35 can be used if needed, as well as valves (not shown) at the inlets/outlets of the components of the RFB 20 to control flow. In this example, the feed lines 38 and the return lines 40 connect the vessels 32, 34 in respective loops L1, L2 with first and second electrodes 42, 44. Multiple cells 36 can be provided as a stack within the loops L1, L2.

The cell or cells 36 each include the first electrode 42, the second electrode 44 spaced apart from the first electrode 42, and an electrolyte separator layer 46 arranged between the first electrode 42 and the second electrode 44. For example, the electrodes 42, 44 are porous electrically-conductive structures, such as carbon paper or felt. The electrodes 42, 44 may also contain additional materials which are catalytically-active, for example a metal oxide. In general, the cell or cells 36 can include bipolar plates, manifolds and the like for delivering the electrolytes 22, 26 through flow field channels to the electrodes 42, 44. It is to be understood, however, that other configurations can be used. For example, the cell or cells 36 can alternatively be configured for flow-through operation where the fluid electrolytes 22, 26 are pumped directly into the electrodes 42, 44 without the use of flow field channels.

The electrolyte separator layer 46 can be, but is not limited to, an ionic-exchange membrane, a micro-porous polymer membrane or an electrically insulating microporous matrix of a material, such as silicon carbide (SiC), that prevents the fluid electrolytes 22, 26 from freely and rapidly mixing but permits selected ions to pass through to complete the redox reactions while electrically isolating the electrodes 42, 44. In this regard, the loops L1, L2 are isolated from each other during normal operation, such as charge, discharge and shutdown states.

The fluid electrolytes 22, 26 are delivered to, and circulate through, the cell or cells 36 during an active charge/discharge mode to either convert electrical energy into chemical energy or, in the reverse reaction, convert chemical energy into electrical energy that is discharged. The electrical energy is transmitted to and from the cell or cells 36 through an electric circuit 48 that is electrically coupled with the electrodes 42, 44.

As known, the electrochemical window of operation for aqueous electrolytes in RFBs is small and is limited by the hydrogen evolution reaction and oxygen evolution reaction. Although RFBs are generally designed to avoid these reaction regimes, the competing balance of operational factors may result in low rates of hydrogen and/or oxygen evolution. Over time with repeated charge/discharge cycles, hydrogen and/or oxygen evolution can lead to electrolyte concentration imbalance, species precipitation, and, therefore, loss of storage capacity. Measures can be taken to detect such conditions with a State-of-Charge cell and implement remedial actions. Such actions, however, may not account for the loss of the hydrogen or oxygen, which may typically be vented from the system. In this regard, as shown in FIG. 1, the disclosed system 10 includes an electrochemical recovery cell 50 that is operable to recover evolved hydrogen and/or oxygen gas and incorporate it back into the electrolyte, thereby reducing electrolyte loss.

As shown in FIG. 1, the system 10 includes a gas vent passage 52 that is connected with the redox flow battery 20 and the electrochemical recovery cell 50. The gas vent passage 52 receives water byproduct (i.e., hydrogen, oxygen, or both) that evolves from side reactions of one or both of the aqueous electrolytes 22, 26. The system 10 further includes a bypass passage 54 that is connected with the redox flow battery 20 and the electrochemical recovery cell 50. The bypass passage 54 receives one of the aqueous electrolytes 22, 26.

The electrochemical recovery cell 50 includes a first half-cell 56a that is connected to the gas vent passage 52 and a second half-cell 56b that is connected to the bypass passage 54. The first half-cell 56a includes a first electrode 58a, and the second half-cell 56b includes a second electrode 58b. A separator 60 is located between the first half-cell 56a and the second half-cell 56b.

Through the gas vent passage 52 the electrochemical recovery cell 50 receives the water byproduct (gas) as a reactant into the first half-cell 56a, and through the bypass passage 54 the electrochemical recovery cell 50 receives one of the electrolytes 22, 26 as a reactant into the second half-cell 56b. The electrolyte 22 or 26, and thus the configuration of which of the electrolytes 22, 26 the bypass line 54 is connected to, depends on which of hydrogen or oxygen is being recovered.

The reactants spontaneously react (i.e., without being driven by an electrical input) in the electrochemical recovery cell 50, resulting in the generation of water in the second half-cell 56b or the first half-cell 56a that is then fed back into the redox flow battery 20. The loss of the hydrogen or oxygen from the system 10 is thereby reduced by reacting the hydrogen or oxygen to produce water and incorporating the water back into the flow battery 20. As an example, for hydrogen recovery, the first (positive) electrolyte 22 is used as the reactant in the second half-cell 56b, and for oxygen recovery the second (negative) electrolyte 26 is used as the reactant in the second half-cell 56b. Example applicable reactions and approximate voltage potentials are shown below based on an all-vanadium chemistry.

Hydrogen Recovery Reactions:
(first half cell) $H_2 \rightarrow 2H^+ + 2e^-$; $V \approx 0.0$ V vs. RHE
(second half cell) $2VO_2^+ + 4H^+ + 2e^- \rightarrow 2VO^{2+} + 2H_2O$; $V \approx 1.0$ V vs. RHE
Overall reaction $H_2 + 2H^+ + 2VO_2^+ \rightarrow 2VO^{2+} + 2H_2O$; OCV $\approx 1.0$ V Oxygen Recovery Reactions:
(first half cell) $\frac{1}{2}O_2 + 2H^+ + 2e^- \rightarrow H_2O$; $V \approx 1.23$ V vs. RHE
(second half-cell) $2V^{2+} \rightarrow 2V^{3+} + 2e^-$; $V \approx -0.25$ V vs. RHE
Overall reaction: $2V^{2+} + \frac{1}{2}O_2 + 2H^+ \rightarrow 2\ V^{3+} + H_2O$; OCV $\approx 1.48$ V The electrodes 58a, 58b of the electrochemical recovery cell 50 are selected in accordance with the reactants that participate in the reactions in the cell 50. For example, the first electrode 58a has a metal catalyst or a phthalocyanine catalyst material that is capable of catalyzing hydrogen or oxygen, and the second electrode 58b includes a catalyst material that is capable of catalyzing the species in electrolyte 22 or 26. For instance, the catalyst material of the second electrode 58b excludes any metal catalysts and may be the same as the catalyst in the redox flow cell 20, such as carbon paper or carbon felt.

In one example, the first electrode 58a is a metal catalyst and is selected to promote the desired reaction, either the hydrogen oxidation reaction (HOR) or the oxygen reduction reaction (ORR). The catalyst material of the first electrode 58a may be selected based on a balance of performance factors. One of the factors may be the pH of the electrolyte 22 or 26. For example, the electrolyte 22 or 26 may cross over the separator 60, and the first electrode 58a and its catalyst material may thus be exposed to the electrolyte 22 or 26. If the catalyst material of the first electrode 58a is not resistant to chemical attack by the electrolyte 22 or 26, the catalyst material may degrade over time. In this regard, for acidic electrolytes 22 or 26, platinum mono-catalyst may be used for the hydrogen reaction or platinum alloy catalysts for the oxygen reaction. Other platinum group metals or alloys may also be used. In an alternate example, the first electrode 58a uses a rhodium sulfide catalyst, $Rh_xS_y$, which is a mixture of $Rh_3S_4$ and $Rh_{17}S_{15}$, and is known to promote the HOR and also be tolerant to contamination by species that may cross over from the second half-cell 56b, such as acid or acid ions. For alkaline electrolytes 22 or 26, non-platinum group metals, such as but not limited to iron, cobalt, and nickel catalysts, may be used for the hydrogen reaction or silver phthalocyanine or iron phthalocyanine catalysts for the oxygen reaction.

The electrochemical recovery cell 50 can also be further adapted for its function for hydrogen or oxygen recovery. For instance, since no electrical input is required, nor is generating electrical output of concern, the electrodes 58a and 58b can be shorted to each other. Furthermore, again since electrical performance is not of concern as in a electrochemical cell for generating or storing electric current, a relatively thick separator 60 can be used to reduce electrolyte cross-over. For instance, the separator 60 is an ion-exchange membrane (IEM), which may be a perfluorinated IEM, such as perfluorosulfonic-acid (PFSA).

Examples of PFSA can include NAFION® or GORE SELECT®. Partially fluorinated IEMs may also be used, such as those based on poly(ethylene-co-tetrafluoroethylene) (ETFE) or PVDF. Hydrocarbon IEMs, with suitable oxidative stability may also be used, such as sulfonated poly(aryl ether ketone), sulfonated poly(aryl ether sulfone), sulfonated poly(imide) These IEMs may be either cation-exchange membranes (CEMs) or anion-exchange membranes (AEMs), and the choice will depend on the chemistry of the electrolyte and other performance factors. Further examples of the separator 60 may include solid-state ion conductors, especially proton conductors, such as alkaline-earth cerates and zirconate based perovskite materials such as acceptor doped $SrCeO_3$, $BaCeO_3$ and $BaZrO_3$. The key performance factor for the separator for this application is the Selectivity, which is herein defined as the ratio of the permeability of the desired charge carrier (i.e., protons and/or hydroxide ions in this case) and the other ions in the electrolyte, which one does not want to transport through the separator. Using a vanadium cation, V4, as an example one can define a dimensionless Selectivity as:

$$S_{v4}=(\kappa \cdot R \cdot T)/(F^2 \cdot P_{v4} \cdot C_{v4})$$

The variables are defined as follows: $S_{V4}$ is the dimensionless selectivity of protons over vanadyl ions $VO^{2+}$, $\kappa$ is the conductivity in S/m, R is the universal gas constant in J $mol^{-1} \cdot K^{-1}$, T is the absolute temperature in K, F is the Faraday constant in $C \cdot mol^{-1}$, $P_{V4}$ is the permeability of $VO^{2+}$ in $m^2 \cdot s^{-1}$, and $C_{V4}$ is the concentration of $VO^{2+}$ in the solution adjacent to the membrane. The separator should have a dimensionless selectivity of more than 1000, and preferably be >4000. The separator should preferably be significantly thicker than those used in flow battery cells, since the ohmic loss of the cell is not a concern. The separator has a thickness of at least 50 micrometers, and preferably be in the range of 100 to 300 micrometers.

Figure 3:
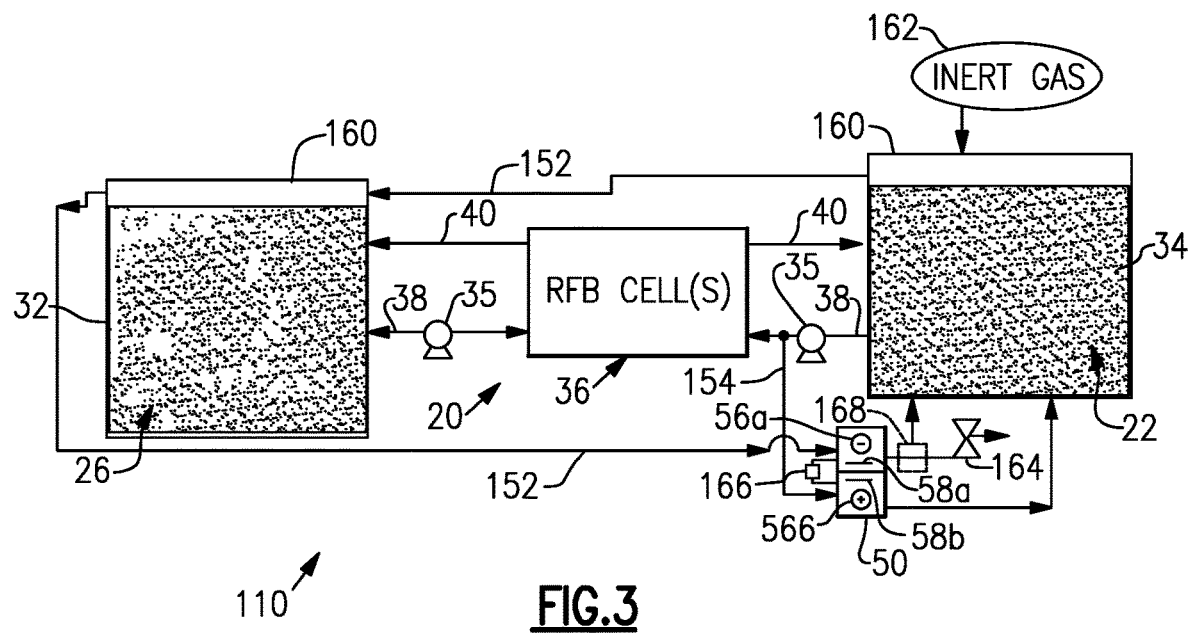
FIG. 3 illustrates another example system in which a gas vent passage is connected to the vessels of the redox flow battery.

FIG. 3 illustrates another example system 110, which as will be described below is configured for hydrogen recovery. In this disclosure, like reference numerals designate like elements where appropriate and reference numerals with the addition of one-hundred or multiples thereof designate modified elements that are understood to incorporate the same features and benefits of the corresponding elements. In this example, each of the vessels 32 and 34 include a respective headspace 160. The electrolytes 22, 26 do not completely fill the vessels 32, 34. The headspace 160 is the region or volume of the vessel 32, 34 above the level of the electrolyte 22, 26. The gas vent passage 152 is connected with the headspaces 160 of the vessels 32, 34.

An inert gas source 162 is connected with at least one of the headspaces 160. In this example, the inert gas source 162 is connected to the headspace 160 of the vessel 34 (of the positive electrolyte 22). For instance, the inert gas source 162 provides pressurized inert gas, such as but not limited to nitrogen or argon. The inert gas source 162 maintains a positive pressure in the headspaces 160 and gas vent passage 152, to reduce infiltration of air into the system from the surrounding environment.

The bypass passage 154 in this example is connected to the feed line 38 of the positive electrolyte 22. Here, the bypass passage 154 connects to the feed line 38 at a location downstream of the pump 35. The connection may include a valve to control flow of the electrolyte 22 into the bypass passage. The flow may additionally or alternatively be controlled by the selected size of the cross-sectional flow area of the bypass passage 154. For example, the cross-section is substantially smaller than that of the feed line 38 such that only a relatively small amount of bleed flow exits to the bypass passage 154.

In this example, the system 110 also includes a pressure relief valve 164 located downstream of the electrochemical recovery cell 50 and upstream of the vessel 34. The pressure relief valve 164 is operable to release gas from the gas vent passage 152 when the pressure in the gas vent passage 152 exceeds a threshold pressure of the pressure relief valve 164.

In this example, during operation of the redox flow cell 20, side reactions in the negative electrolyte 26 may evolve hydrogen gas. The hydrogen gas migrates to the headspace 160 of the vessel 32 and is captured by the gas vent passage 152 connected to the headspace 160. Although the inert gas source 162 maintains a positive pressure in the gas vent passage 154 and headspaces 160, there is not a continuous flow of the inert gas through the gas vent passage 154. Rather, as hydrogen evolves, the pressure in the gas vent passage 152 and headspace 160 increases. Once the pressure increases beyond the threshold pressure of the pressure relief valve 164, the pressure relief valve 164 releases gas until the pressure reduces below the threshold. The release causes a transient flow in the gas vent passage 152 and headspace 160 such that the inert gas and hydrogen pass through the first half-cell 56a of the electrochemical recovery cell 50. The flow of the hydrogen through the electrochemical recovery cell 50 thus depends on pressure-release of the pressure relief valve 164.

At the same time, the positive electrolyte 22 is either flowing or present in the second half-cell 56b. The hydrogen and electrolyte 26 participate in the reactions as described above to thereby produce water in the second half-cell 56b. The bypass passage 154 returns to the vessel 34 and the water is thus incorporated into the electrolyte 22. In this manner, rather than a loss of hydrogen, the hydrogen is recovered into the system 110. The inert gas and any unreacted hydrogen may be vented from the pressure-relief valve 164. Alternatively, rather than venting, the released gas may be conserved by discharging into the bypass line 154 (e.g., using an eductor) prior to entry into the vessel 34 or directly into the vessel 34. The electrochemical recovery cell 50 can be simply shorted electrically, or the voltage can be controlled to a desired value using a potentiostat 166.

The control and response methodology of the electrochemical recovery cell 50 may use a fixed potential approach. In a fixed potential approach, the voltage applied between the electrodes 58a and 58b is held constant at a value below the cell voltage defined by the intended reaction (e.g. 1.00 V for the hydrogen recovery reaction paired with $VO^{2+}/VO_2^+$). This constant voltage must be applied by electrically connecting the electrodes 52, 54 with a fixed-voltage device capable of accepting the current generated by the recovery cell.

As will be appreciated, the system 110 can alternatively be modified for oxygen recovery due to oxygen evolution from the positive electrolyte 22. For instance, for oxygen recovery, the bypass line 154 is connected off of the feed line 38 from the vessel 32 that contains the negative electrolyte 26 and the bypass line 154 returns to the vessel 32. In either case, for hydrogen or oxygen recovery, the resulting water is returned to the opposite electrolyte 22, 26 from which the recovered hydrogen or oxygen evolved. However, water is readily transported through the separator 46 of the redox flow battery 20 and thereby redistributed between the electrolytes 22, 26. Preferably, the pressure of the gas in the electrochemical recovery cell 50 should be higher than the pressure of the liquid to help promote the recovery of the liquid water. The system may optionally include a water trap, or liquid-gas separator device 168, between the electrochemical recovery cell 50 and the pressure-relief valve 164 to help enhance the recovery of the water that may be contained in the gas exiting the cell.

Figure 4:
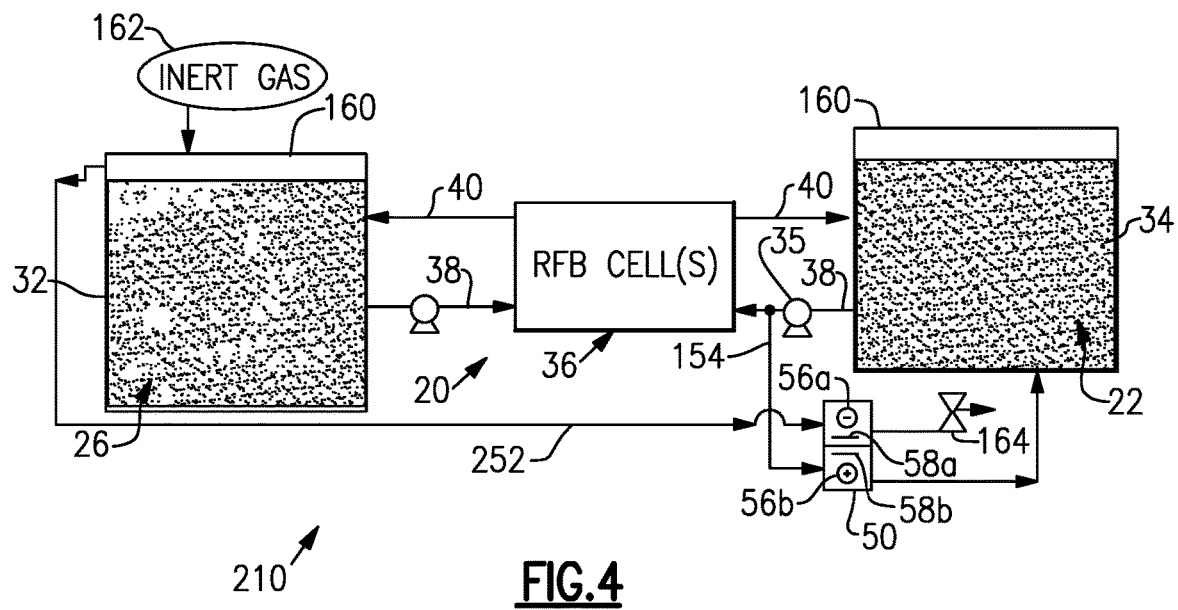
FIG. 4 illustrates another example system in which a gas vent passage is connected to only one of the vessels of the redox flow battery.

In the example in FIG. 3, the gas vent passage 152 connects the headspaces 160 of both vessels 32, 34. The gas vent passage 152 thereby captures evolved hydrogen (or oxygen) from both electrolytes 22, 26, even though only one of hydrogen or oxygen is recovered in that configuration. FIG. 4 illustrates a further example system 210 in which the gas vent passage 252 connects to only one of the headspaces 160. Practically, hydrogen evolution primarily occurs in the negative electrolyte 26 due to overpotentials in the negative electrode 44. In this regard, the gas vent passage 252 is connected only to the headspace 160 of the vessel 32 of the negative electrolyte 26. Likewise, the inert gas source 162 is connected to the vessel 32 to maintain the positive pressure in the headspace 160 of the vessel 32 and the gas vent passage 252. A separate inert gas source and venting system may be used for the headspace 160 of the vessel 34, to serve as a cover gas to limit undesired side reactions of the electrolyte 22 in the vessel 34. Alternatively, for oxygen recovery, oxygen evolution primarily occurs in the positive electrolyte 22 due to overpotentials in the positive electrode 42 and the gas vent passage 252 would be connected only to the headspace 160 of the vessel 34.

Figure 5:
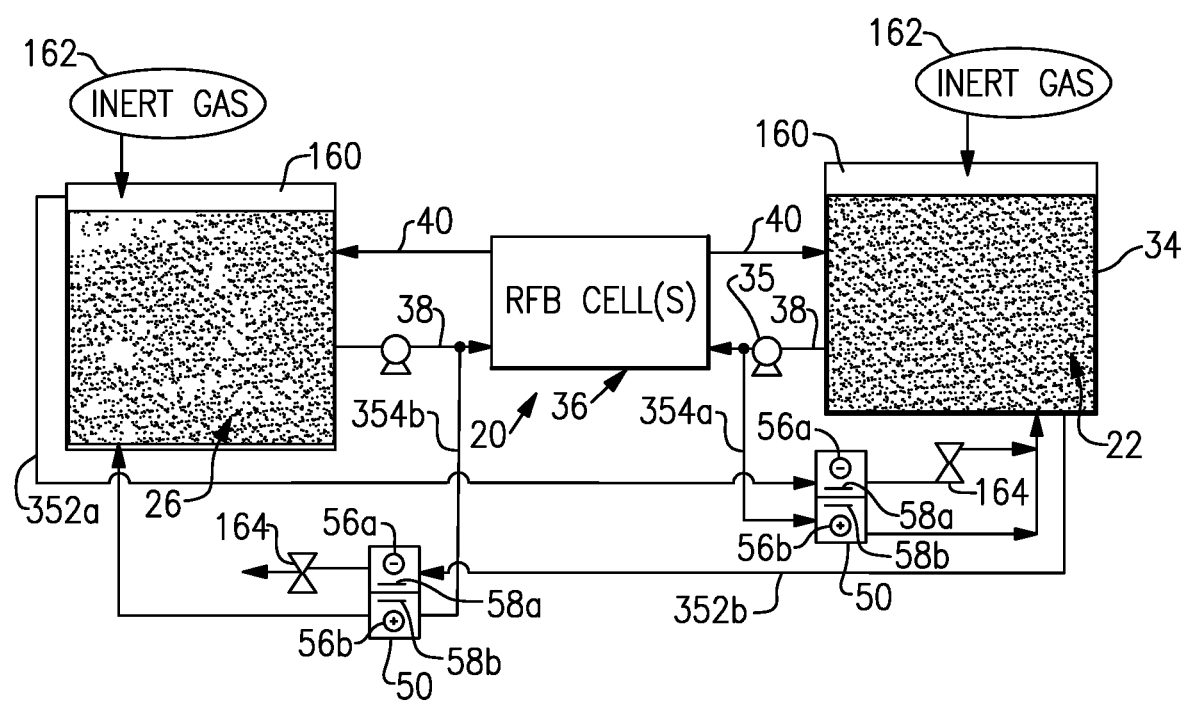
FIG. 5 illustrates another example system that includes two electrochemical recovery cells.

FIG. 5 illustrates another example system 310 that is configured for both hydrogen and oxygen recovery. In this example, the system 310 includes two gas vent passages 352a, 352b, two electrochemical recovery cells 50, and two bypass passages 354a, 354b. The gas vent passage 352a is connected to the headspace of the vessel 32 and one of the electrochemical recovery cells 50, and the gas vent passage 352b is connected to the headspace 160 of the vessel 34 and the other of the electrochemical recovery cells 50. The bypass passage 354a is connected to the feed line 38 from the vessel 34 of the positive electrolyte 22, and the bypass passage 354b is connected to the feed line 38 from the vessel 32 of the negative electrolyte 26.

For hydrogen evolution in the negative electrolyte 26, the hydrogen is captured in the gas vent passage 352a and reacted in the electrochemical recovery cell 50 with the positive electrolyte 22 from the bypass passage 354a. For oxygen evolution in the positive electrolyte 22, the oxygen is separately captured in the gas vent passage 352b and reacted in the other electrochemical recovery cell 50 with the negative electrolyte 26 from the bypass passage 354b. In this manner, both hydrogen and oxygen are recovered.

It is to be appreciated that the description above also contemplates a method for recovering water byproducts, such as hydrogen or oxygen, in a redox flow battery system. Such a method may include operating the redox flow battery 20, where the electrolytes 22, 26 generate water byproduct from side reactions. The water byproducts are captured in the gas vent passage 52, 152, 252, 352a, 352b that is connected with the redox flow battery 20. The water byproducts are then recovered by passing the water byproducts through the electrochemical recovery cell 50, which reacts the water byproducts to produce water that is incorporated back into one of the electrolytes 22, 26.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A redox flow battery system comprising:
   a redox flow battery including
      a redox flow cell, and
      a supply/storage system external of the redox flow cell, the supply/storage system including first and second electrolytes for circulation through the redox flow cell, the first and second electrolytes being aqueous liquid electrolytes having electrochemically active species with multiple, reversible oxidation states;
   a gas vent passage connected with the redox flow battery to receive water byproduct that evolves from side reaction of the first electrolyte;
   a bypass passage connected with the supply/storage system to receive the second electrolyte; and
   an electrochemical recovery cell including a first half-cell connected to the gas vent passage to receive as a reactant the water byproduct and a second half-cell connected to the bypass passage to receive as a reactant the second electrolyte, the first half-cell including a first electrode that has a metal catalyst including rhodium sulfide, $Rh_xS_y$, and the second half-cell including a second electrode excluding any metal catalyst.

2. The redox flow battery system as recited in claim 1, wherein the gas vent passage includes a pressure relief valve downstream of the supply/storage system and the electrochemical recovery cell such that flow of the water byproduct through the electrochemical recovery cell depends on pressure-release of the pressure relief valve.

3. The redox flow battery system as recited in claim 1, wherein the supply/storage system includes at least one storage vessel, and the gas vent passage is connected with a headspace of the storage vessel.

4. The redox flow battery system as recited in claim 3, further comprising an inert gas source connected with the headspace and maintaining a positive pressure in the headspace and the gas vent passage.

5. The redox flow battery system as recited in claim 3, wherein downstream of the electrochemical recovery cell the bypass passage leads into the at least one storage vessel.

6. The redox flow battery system as recited in claim 1, wherein the second electrode is carbon paper.

7. The redox flow battery system as recited in claim 1, wherein the electrochemical recovery cell includes a separator between the first half-cell and the second half-cell, and the separator is an ion exchange membrane, has a thickness of 50 to 300 micrometers, and has a dimensionless selectivity of at least 1000.

8. The redox flow battery system as recited in claim 1, further comprising an additional electrochemical recovery cell including an additional first half-cell and an additional second half-cell, an additional gas vent passage, and an additional bypass passage connected with the redox flow battery to receive water byproduct that evolves from side reaction of the second electrolyte, the additional first half-cell connected to the additional gas vent passage to receive as a reactant the water byproduct of the second electrolyte and the additional second half-cell connected to the additional bypass passage to receive as a reactant the first electrolyte.

9. The redox flow battery system as recited in claim 1, further comprising a potentiostat controlling voltage of the electrochemical recovery cell.

10. A method for recovering water byproducts in a redox flow battery system, the method comprising: operating a redox flow battery that includes a redox flow cell and a supply/storage system external of the redox flow cell, the supply/storage system including first and second electrolytes that circulate through the redox flow cell during operation, at least the first electrolyte is an aqueous liquid electrolyte that has electrochemically active species with multiple, reversible oxidation states, wherein the aqueous electrolyte generating water byproduct from side reactions of the first electrolyte; capturing the water byproduct in a gas vent passage that is connected with the redox flow battery; and recovering the water byproduct by passing the water byproduct through a first half-cell of an electrochemical recovery cell and passing the aqueous electrolyte from a bypass passage that is connected with the supply/storage system through a second half-cell of the electrochemical recovery cell, the electrochemical recovery cell reacting the water byproduct to produce water that is incorporated in the aqueous electrolyte, wherein the first half-cell includes a first electrode that has a metal catalyst that includes rhodium sulfide, $Rh_xSy$ and the second half-cell includes a second electrode that excludes any metal catalyst.

11. The method as recited in claim 10, wherein the passing the water byproduct through the first half-cell depends on a pressure-release of a pressure relief valve downstream of the electrochemical recovery cell.

12. The method as recited in claim 10, wherein the supply/storage system includes at least one storage vessel containing the first electrolyte, and the water byproduct is captured from a headspace of the storage vessel.

13. The method as recited in claim 12, further comprising maintaining a positive pressure in the headspace and the gas vent passage using an inert gas source connected with the headspace.

14. The method as recited in claim 10, wherein the second electrode is carbon paper.

15. The method as recited in claim 10, wherein the electrochemical recovery cell includes a separator between the first half-cell and the second half-cell, and the separator is an ion exchange membrane, has a thickness of 50 to 300 micrometers, and has a dimensionless selectivity of at least 1000.

* * * * *